P. PLANTINGA.
LATHE.
APPLICATION FILED JUNE 28, 1916.

1,274,770.

Patented Aug. 6, 1918.
5 SHEETS—SHEET 1.

WITNESSES:
Francis Jordon Jr.
George D. Powell

INVENTOR
Peter Plantinga
BY
his ATTORNEYS

P. PLANTINGA.
LATHE.
APPLICATION FILED JUNE 28, 1916.
1,274,770.
Patented Aug. 6, 1918.
5 SHEETS—SHEET 2.
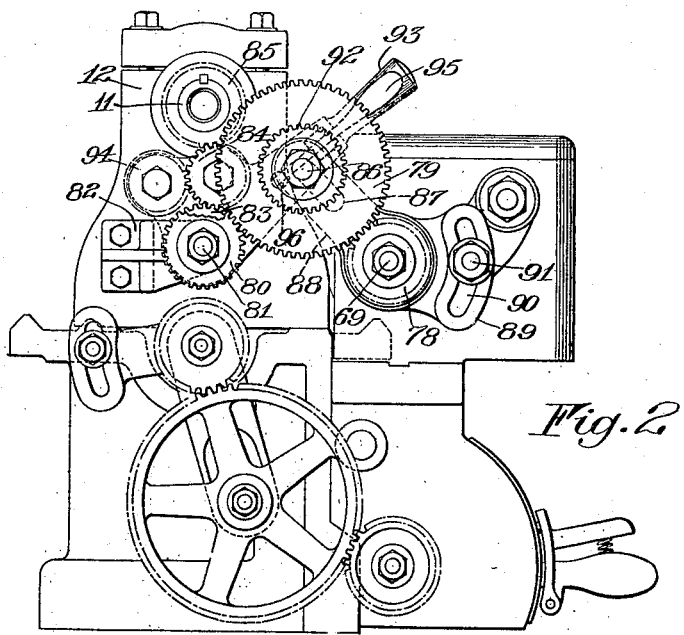
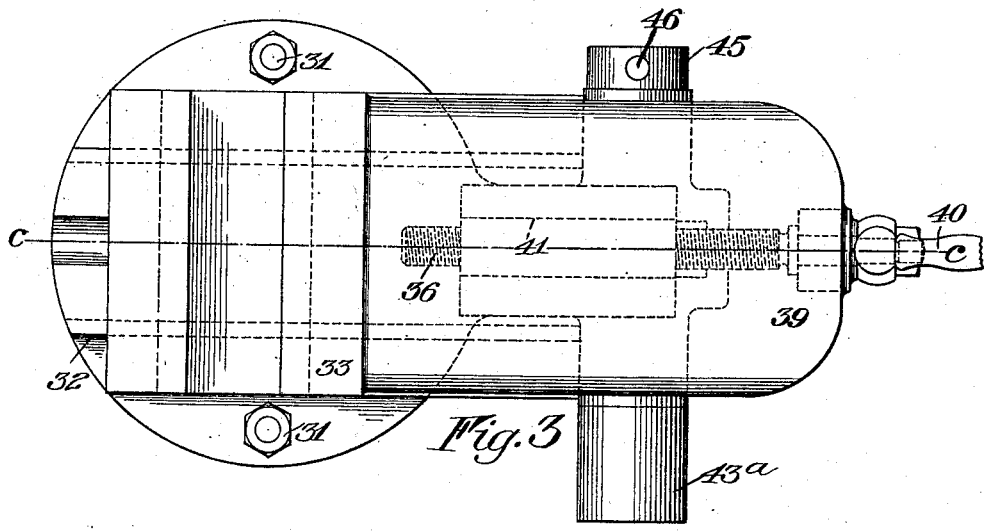
WITNESSES:
INVENTOR
Peter Plantinga
BY
his ATTORNEYS

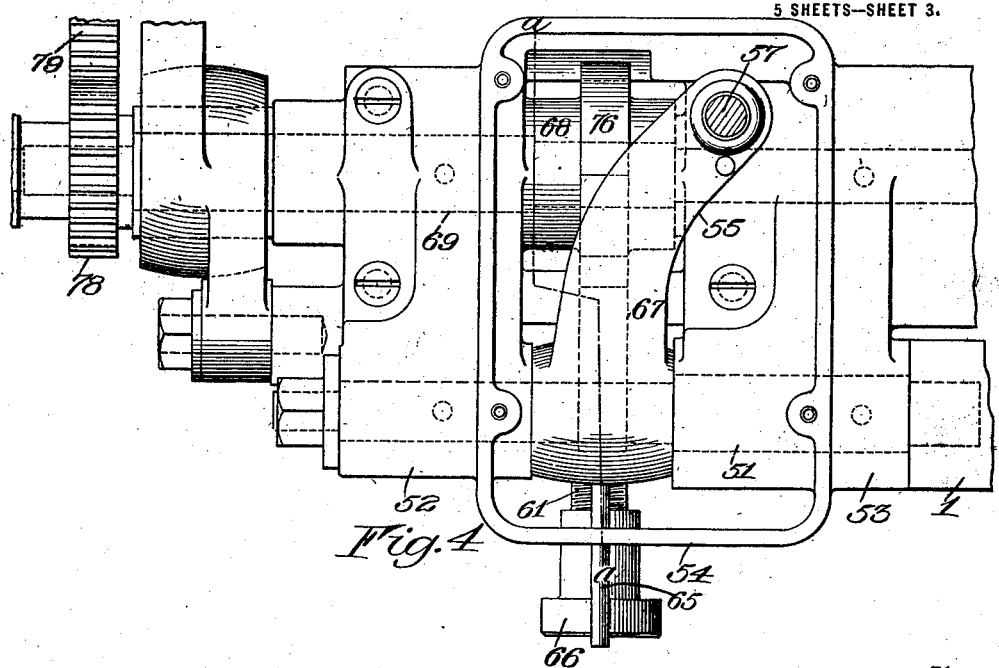
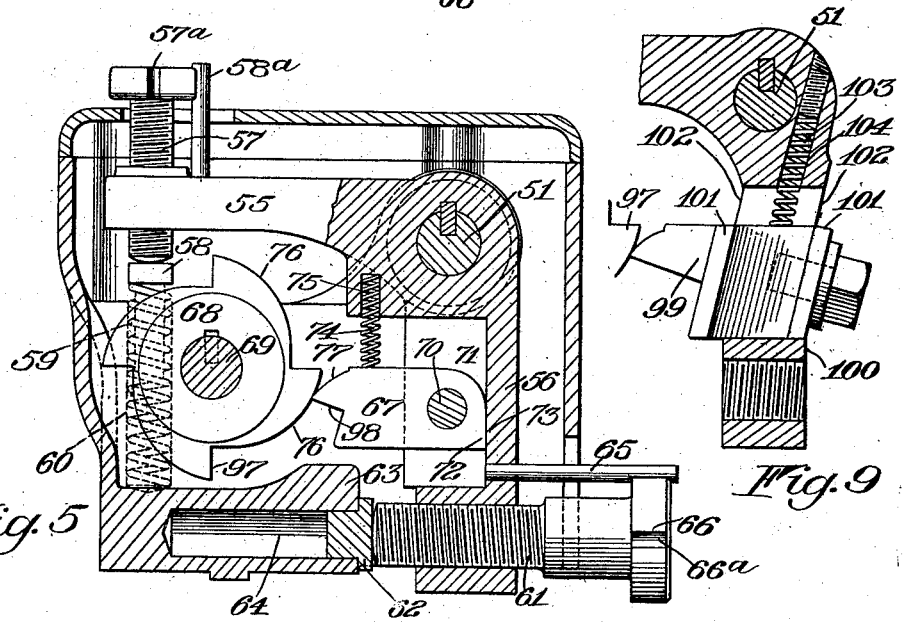

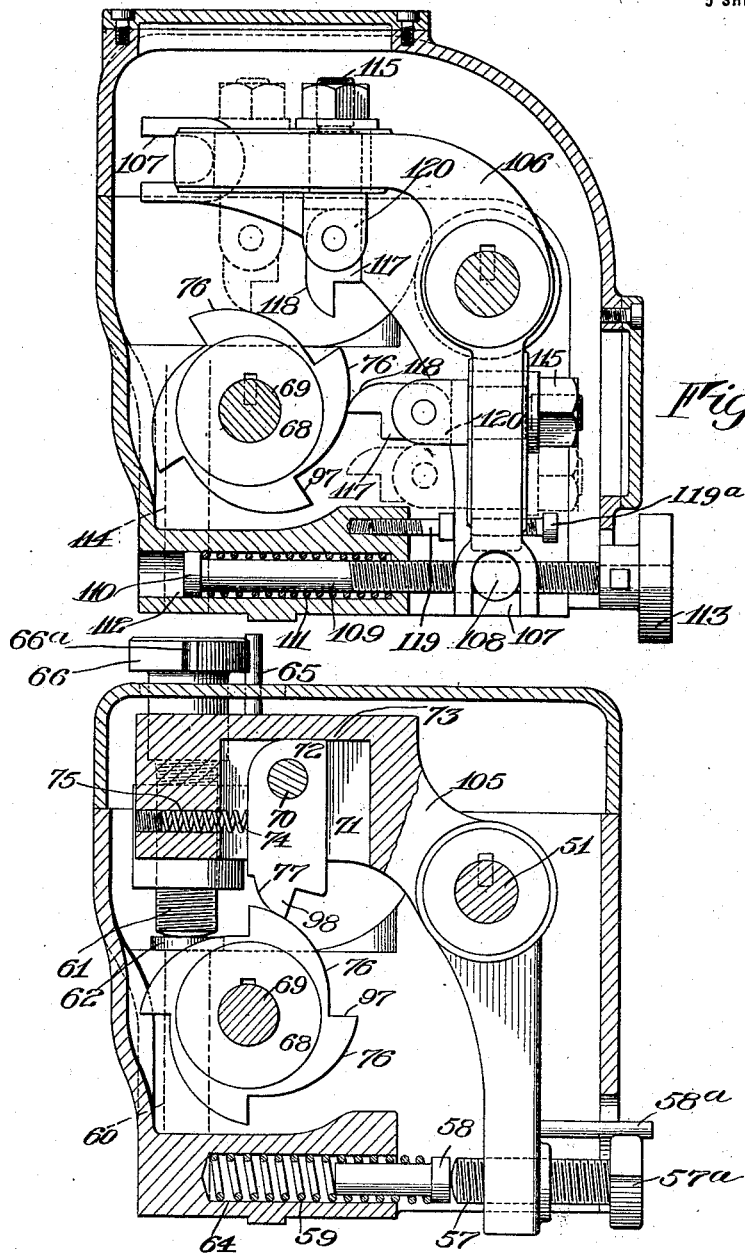

UNITED STATES PATENT OFFICE.

PETER PLANTINGA, OF ROCHESTER, NEW YORK, ASSIGNOR TO DAVIS MACHINE TOOL COMPANY, INC., OF ROCHESTER, NEW YORK, A CORPORATION OF NEW YORK.

LATHE.

1,274,770. Specification of Letters Patent. Patented Aug. 6, 1918.

Application filed June 28, 1916. Serial No. 106,302.

*To all whom it may concern:*

Be it known that I, PETER PLANTINGA, of Rochester, in the county of Monroe and State of New York, have invented certain new and useful Improvements in Lathes; and I do hereby declare the following to be a full, clear, and exact description of the same, reference being had to the accompanying drawings, forming a part of this specification, and to the reference characters marked thereon.

My invention relates to improvements in lathes and has for its object to provide a machine designed particularly for interior and exterior relieving upon various kinds of work, such as taps, dies and reamers. A further object of the invention is to provide a lathe carrying a tool holding member arranged to be actuated by either of two operating members jointly connected with the tool holding member. To these and other ends the invention consists in certain improvements and combinations of parts, all as will be hereinafter more fully described, the novel features being pointed out in the claims at the end of the specification.

In the drawings:

Fig. 2 is an end elevation of the same;

Fig. 3 is an enlarged detail plan view of the tool supporting slide and table shown in Fig. 1;

Fig. 4 is a top plan view illustrating on an enlarged scale a portion of the mechanism for automatically moving the tool holding slide transversely of the machine;

Fig. 5 is a view in section taken on line *a—a* of Fig. 4;

Fig. 9 is a sectional elevation of a slightly modified form of the cam operated mechanism shown in Fig. 5;

Fig. 10 is a sectional view illustrating another modification of the mechanism shown in Fig. 5;

Fig. 11 is still another modification of said mechanism, and

Similar reference characters throughout the several views indicate the same parts.

Figure 1:
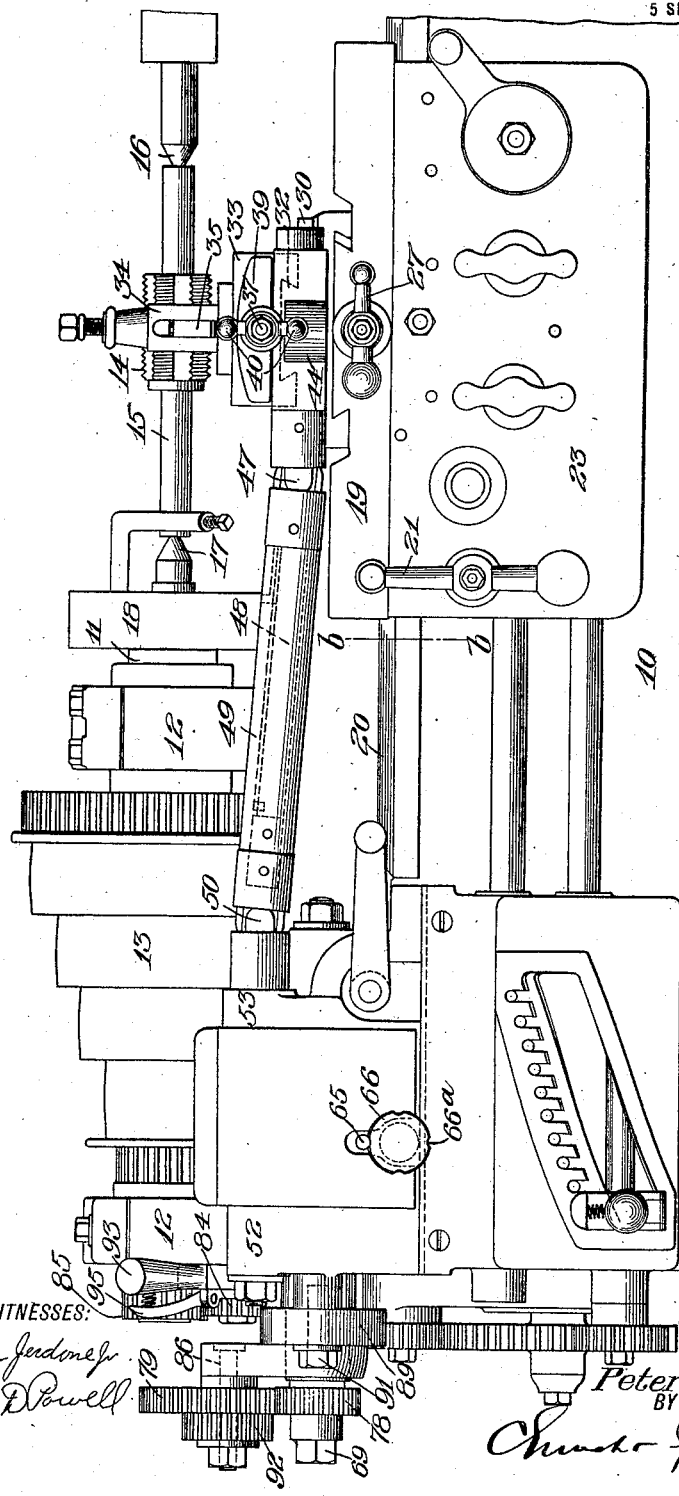
Figure 1 is a side elevation of a machine embodying one form of the invention.

In carrying out my invention I have provided a universal telescopic shaft operatively connected with a tool supporting slide and arranged to be rocked by a cam actuated lever for moving a tool into and out of engagement with a work piece in conjunction with independent means for moving the slide longitudinally and transversely of the machine. As an example of the kind of work which the present invention is capable of performing I have shown a work piece in the form of a tap adapted to be operated upon by a relieving attachment, it being understood that the machine is adaptable for other classes of work as well, such as interior relieving or shaping of different kinds. Referring to the drawings by numerals, 10 represents the frame or bed of the machine upon which is mounted a spindle 11 supported in bearings 12 and provided with a cone pulley 13. A work piece 14 in the form of a tap is carried by a support 15, the opposite ends of which are supported on centers at 16 and 17. Rotation of the work piece is effected by the rotation of the driving plate 18 on the spindle 11. A carriage 19 is reciprocally mounted longitudinally of the machine upon guides 20 and may be operated at different speeds by means of a system of change gears suitably connected with the carriage. The carriage may also be reciprocated by hand through the medium of the handle 21 on a shaft 22 journaled in an apron 23 and carrying a pinion 24 meshing with a rack 25 on the bed 10, the apron 23 being suitably connected with the carriage 19 in any preferred manner. A transverse slide 26 is mounted upon the carriage 19 and is arranged to be reciprocated by means of a handle 27 on a feed screw 28 having threaded engagement with a lug 29 projecting from the slide. Upon the slide 26 is rotatably mounted a table 30 which is normally held stationary upon the slide by means of the clamping bolts 31 which may be loosened to permit the table to be revolved to any desired position.

Figure 6:
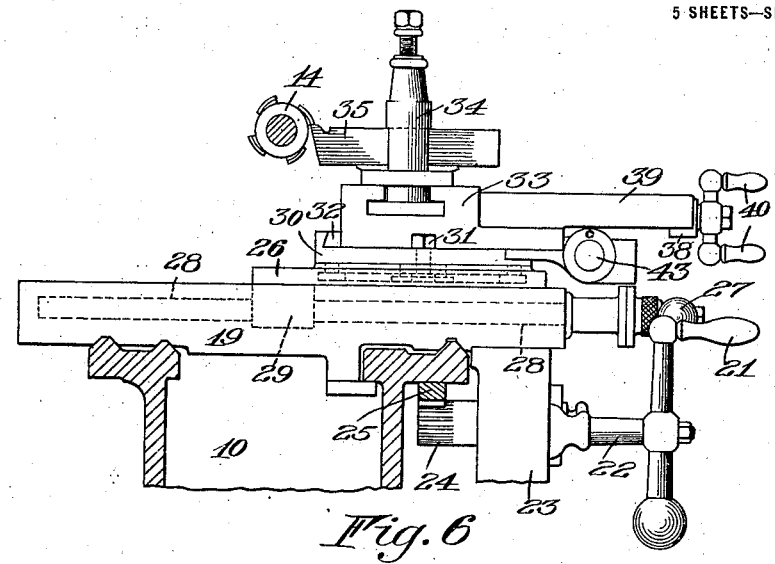
Fig. 6 is a fragmentary sectional elevation taken on line *b—b* of Fig. 1.
Figure 7:
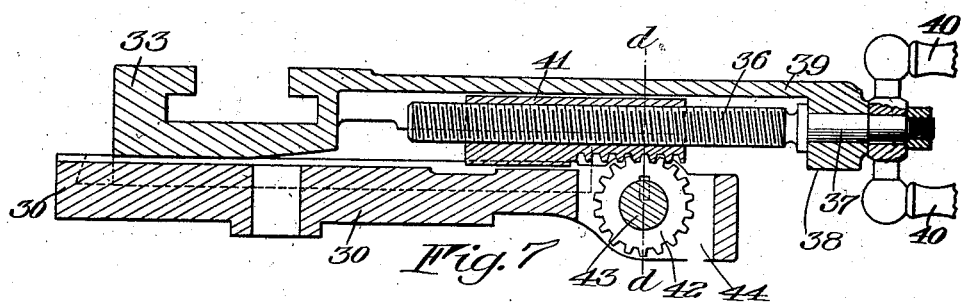
Fig. 7 is a view in section taken on line *c—c* of Fig. 3.
Figures 8, 12:
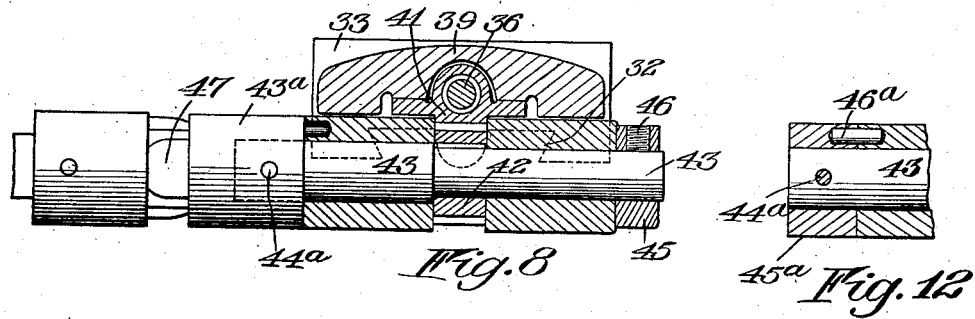
Fig. 8 is a sectional view taken on line *d—d* of Fig. 7.
Fig. 12 is a sectional view illustrating means for locking the short shaft shown in Fig. 8.

The table is provided with guides 32 upon which a reciprocatory tool holding slide 33 is mounted as shown in Figs. 6 and 7. The slide 33 is adapted to receive any suitable tool holding member such as the tool post 34 carrying the tool 35 adapted to operate upon the work piece 14 in a manner which will presently be described. The slide 33 is arranged to be reciprocated both automatically and by hand and in the case of the latter by means of a feed screw 36, the outer end 37 of which is journaled in a lug 38 on an extension 39 carried by the slide 33. The feed screw 36 is rotated by a handle 40, the screw having threaded engagement with a rack 41 meshing with a gear wheel 42 rigidly mounted upon a short shaft 43 in a recess 44 formed in the table 30. The slide 33 may be moved by the turning of the handle 40 to properly position the tool 35 with respect to the work piece when it is desired to operate the machine by rotation of the spindle 11. The opposite ends of the shaft 43 are journaled upon the table 30 as shown in Fig. 8, the outer end of the shaft being secured by a collar 45 held by a set screw 46. The inner end of the short shaft is removably connected with a sleeve 43ᵃ of a universal joint or coupling 47 which is provided with an extension 48 slidably keyed within a sleeve 49 rigidly secured to a universal joint 50 which in turn is connected with a cam controlled shaft 51. The shaft 43 is connected with the sleeve 43ᵃ by means of a pin 44ᵃ as shown in Fig. 8. In case it is desired to use the slide 33 independently of the universal shaft the latter is removed and a collar 45ᵃ is placed upon the inner end of the shaft 43 and locked thereon by means of the pin 44ᵃ. The collar is locked upon the slide by means of a pin 46ᵃ as shown in Fig. 12. The shaft 43 and pinion 42 are thus prevented from turning whereby the rack 41 is held when the feed screw 36 is rotated to move the slide 33. The ends of the shaft 51 are journaled in spaced bearings 52 and 53 preferably formed integral with a casing 54 positioned upon the bed of the machine. Mounted upon the shaft 51 between the bearings 52 and 53 and within the casing 54 is a bell crank having horizontally and vertically extending arms 55 and 56 respectively, as shown in Fig. 5. The arm 55 carries an adjustable stop screw 57 which engages the head of a spring actuated bolt 58, the spring 59 being housed in a recess 60 formed within the casing 54. The arm 56 is provided at its lower end with a gage screw 61, the inner end of which rests upon a removable stop 62 seated upon a projection 63 in which is formed a recess 64 as shown in Fig. 5. The arm 56 carries a rod 65, the free end of which is arranged to coöperate with the notches 66ᵃ upon the head 66 of the adjusting screw 61 for holding the screw against accidental displacement when set to properly position the trip 67 with respect to a cam member 68 keyed upon a shaft 69. The free end of the rod 65 will move sufficiently when pressure is exerted upon the head of the screw 61 to permit the screw to turn without having to remove the rod from the arm. Likewise, the head of the screw 57 is notched as indicated at 57ᵃ to receive the outer end of the rod 58ᵃ, the inner end of which is seated in the arm 55. The trip 67 is pivotally mounted upon a pin 70 seated in a recess 71 formed in the arm 56 and is provided with a shoulder 72 which normally rests against the wall 73 of the arm to prevent downward movement of the member from the position shown in Fig. 5. The trip is held in this position by a spring 74 seated in a recess 75 as shown. The cam member 68 is provided with a plurality of lobes 76 which are arranged, when rotated in one direction to engage a curved or bevel face 77 on the trip to cause outward movement of the arm 56 and a consequent rocking of the shaft 51, which motion will be transmitted to the short shaft 43 thereby causing the gear 42 to move the rack 41 for advancing the tool 35 into cutting engagement with the work piece 14. As each one of the lobes 76 disengages the beveled projection 77 on the trip the shaft 51 and all of the parts operatively connected therewith are returned to normal position by the action of the spring 59 in forcing the arm 55 back to the position shown in Fig. 5. The rotation of the shaft 69 carrying the cam member 68 is effected by the rotation of the gear 78 driven by the gear 79 meshing with a gear 80 on a shaft 81. The shaft 81 is journaled in a bracket 82 and at the rear of the bracket and upon said shaft is mounted a gear 83 meshing with a gear 84 which is driven by a gear 85 on the spindle 11. The gear 79 is mounted upon a stud 86 which is movable in a slot 87 formed in an arm 88 pivoted on the cam shaft 69. The arm 88 is provided with a segment 89 having a curved slot 90 through which projects a bolt or stud 91 for clamping or securing the arm after it has been shifted to any desired position to accommodate different size gears on the stud 86 which are adapted to mesh with and be driven by the gear 80 for driving the cam shaft 69. In the present instance an additional and smaller gear 92 is positioned upon the stud 86 and connected with the gear 79, and upon reversing the position of these gears the small gear may be made to mesh with the gear 78 by moving the stud 86 downwardly in the slot 87. At the same time by loosening the bolt 90 the arm 88 may be lowered until the gear 92 is brought into engagement with a gear on the shaft 81 substituted for the present gear 80 and of greater diameter than the latter. In this way different speeds for the shaft 69 may be obtained. If it is desired to reverse the movement of the cam shaft 69 the lever 93, which is pivoted upon the shaft 81 and carries the gears 84 and 94, may be pulled down to cause the former of said gears to disengage the gear 85 and the latter to be brought into engagement therewith. A pivotal spring actuated locking member 95 is carried by the lever 93 and provided with a projection 96 at one end adapted to be moved into and out of locking engagement with a portion of the frame or bed of the machine. When the rotation of the cam shaft 69 is reversed the shoulders 97 of the lobes 76 will engage the face 98 of the trip 67 and elevate the trip without effecting the operation of the arm 56. It will be understood that by means of the screw 61 the trip 67 may be moved toward and away from the cams 76 or out of engagement therewith to regulate the throw of the shaft 51 for adjusting the movement of the slide 33 and tool 35 with respect to the work piece 14, whereby cuts of varying depth may be formed upon said work piece.

In the modification shown in Fig. 9 the projection 99 provided for rocking the arm 100, which corresponds to the trip 67 in Fig. 5, is mounted upon a slide having guides 101 movable upon the inclined faces 102 of the arm 100. The slide is actuated downwardly by a spring 103 seated in a recess 104 as shown. The purpose of moving the slide upon an incline is to permit the shoulder 97 of the lobes 76 to clear the projection 99 without rocking the arm, which is accomplished by the movement of the slide away from the cams as it is moved upwardly upon an incline by said shoulders. The modification shown in Fig. 10 is essentially the same as that shown in Fig. 5 but is adapted for interior relieving while the arrangement in Fig. 5 is for affording exterior relieving as already described. This is accomplished by reversing the rocking movement of the shaft 51 by the use of a bell crank 105 upon the horizontal arm of which is pivoted the trip 67 instead of upon the vertical arm, as shown in Fig. 5. In substituting the bell crank 105 in Fig. 10 it is also necessary to move the spring 59 and bolt 58 to the recess 64 and the stop 62 to the recess 60, as well as the stop screw 57 and gage screw 61.

In the modification shown in Fig. 11 the mechanism is so arranged that the same bell crank can be used for performing both the interior and exterior relieving. In this instance the arms of the bell crank 106 are similarly constructed, the ends of which are forked as indicated at 107 to receive a removable stud 108 through which a bolt 109 is threaded having a head 110 forming a seat for one end of a spring 111 seated in a recess 112 as shown. Upon the outer end of the bolt 109 is secured a thumb nut 113 for turning the bolt to regulate the tension upon the spring 111. When it is desired to reverse the operation of the bell crank and shaft 51, the parts just described are removed and positioned so that the stud 108 will be engaged by the forked end of the horizontal arm of the bell crank and the bolt 109 and spring 111 will then occupy the recess 114. The arms of the bell crank are each provided with bolts 115 which extend through slots 116 formed in the arms. The bolts may be clamped in any desired position upon the arms and are provided with the pivoted trips 117 which carry cam engaging faces 118 adapted to be engaged by the lobes 76 as shown. When one of the trips is in position to be engaged by the lobes 76 the other is moved out of the path of said cams. The position of the trips 117 for reversing the movement of the shaft 51 is indicated by dotted lines in Fig. 11. An adjustable stop screw 119 is provided for limiting the movement of the bell crank in one direction while a screw 119$^a$ is employed when the lever is moved in the opposite direction by the cam during interior relieving. The trips 117 are free to move upon their pivots in one direction, but are prevented from moving in opposite directions by the shoulders 120 which engage the bolts 115 as shown. It will thus be seen that rotation of the lobes 76 in one direction will cause the rocking of the shaft 51 while rotation in an opposite direction will not effect movement of said shaft.

I claim as my invention:

1. A lathe comprising in combination a movable work holding member, a slide, a universal shaft operatively connected with the slide, a second shaft connected with said universal shaft, an arm carried by the second mentioned shaft, a cam, means for rotating the cam in opposite directions, a pivotal member connected with the arm extending in the path of the cam and arranged to actuate the arm upon rotation of the cam in one direction only.

2. A lathe comprising in combination a movable work holding member, a slide, a universal shaft operatively connected with the slide, a second shaft connected with said first mentioned shaft, an arm carried by the second mentioned shaft, a cam, means for rotating the cam in opposite directions, a pivoted member connected with the arm extending in the path of the cam and arranged to actuate the arm upon rotation of the cam in one direction only, and means for returning the arm to normal position when moved by said pivoted member.

3. A lathe comprising in combination a work holding member, a slide, a shaft operatively connected with the slide, an arm carried by said shaft, a cam, means for moving the cam, a trip carried by the arm normally engaging the cam and means for moving the arm to cause the trip to disengage the cam.

4. A lathe comprising in combination a work holding member, a slide, a shaft operatively connected with the slide, a cam, means for actuating the cam, and means carried by the shaft adapted to be operated by the cam for actuating said shaft, said means being movable to occupy relatively different positions with respect to the cam.

5. A lathe comprising in combination a work holding member, a slide, a shaft operatively connected with the slide, a cam, means for actuating the cam, an arm connected with the shaft, a movable member carried by the arm normally in position to effect movement of the shaft by movement of the cam and movable to prevent operation of the shaft by movement of the cam.

6. A lathe comprising in combination a work holding member, a tool holding slide, a movable rack upon the slide, a feed screw carried by the slide in engagement with the rack, a rotatably mounted shaft, a gear upon the shaft in engagement with the rack, a universal telescopic shaft operatively connected with and removable from said first mentioned shaft, and means for locking the first mentioned shaft to prevent movement of the rack, whereby when said universal shaft is removed and the feed screw operated movement will be imparted to the slide.

7. In a lathe, the combination of work holding means, a slide, a tool holding member on the slide, a shaft operatively connected with the slide, a bell crank lever on the shaft, means for reciprocating the bell crank, and means for changing the normal position of the bell crank for varying the extent of the reciprocatory movements imparted thereto.

8. In a lathe, the combination of work holding means, a slide, a tool holding member on the slide, a shaft operatively connected with the slide, a bell crank lever on the shaft, a cam, means for rotating the cam, and a projection on the bell crank adjustable into and out of the path of the cam.

9. In a lathe, the combination of work holding means, a slide, a tool holding member on the slide, a shaft operatively connected with the slide, a cam, means for rotating the cam, a bell crank lever on the shaft, and a plurality of dogs adjustable on the bell crank into and out of the path of the cam.

10. In a lathe, the combination of work holding means, a slide, a tool holding member on the slide, a shaft operatively connected with the slide, a cam, means for rotating the cam, a bell crank lever on the shaft, and a dog adjustably mounted on each arm of the bell crank.

PETER PLANTINGA.

Witnesses:
G. WILLARD RICH,
HARRIET T. VAY.

Copies of this patent may be obtained for five cents each, by addressing the "Commissioner of Patents, Washington, D. C."